(12) United States Patent  (10) Patent No.: US 9,071,673 B2
Choi et al.  (45) Date of Patent: Jun. 30, 2015

(54) PORTABLE COMMUNICATION DEVICE HAVING FLEXIBLE DISPLAY UNIT

(75) Inventors: Jeong-Seok Choi, Gyeonggi-do (KR); Byung-Jik Kim, Gyeonggi-do (KR); Young-Min Lee, Gyeonggi-do (KR); Kang-Ho Byun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 33 days.

(21) Appl. No.: 13/447,739

(22) Filed: Apr. 16, 2012

(65) Prior Publication Data

US 2012/0264489 A1  Oct. 18, 2012

(30) Foreign Application Priority Data

Apr. 14, 2011 (KR) .................. 10-2011-0034712

(51) Int. Cl.
  *G09G 5/00* (2006.01)
  *H04M 1/02* (2006.01)
  *G06F 1/16* (2006.01)

(52) U.S. Cl.
  CPC .......... *H04M 1/0268* (2013.01); *H04M 1/0216* (2013.01); *H04M 1/0247* (2013.01); *G06F 1/1641* (2013.01); *G06F 1/1652* (2013.01)

(58) Field of Classification Search
  CPC ............ Y10S 345/905; H04M 1/0214; H04M 1/0227; H04M 1/0233; H04M 1/0237; G06F 1/1652

USPC ................ 455/575.1, 566, 90.2, 90.3, 575.3; 345/1.1–1.3

See application file for complete search history.

(56) References Cited

U.S. PATENT DOCUMENTS

| | | | | |
|---|---|---|---|---|
| 7,539,526 | B2 * | 5/2009 | Pirila et al. | 455/575.3 |
| 2006/0012951 | A1 * | 1/2006 | Kim | 361/681 |
| 2007/0072657 | A1 * | 3/2007 | Hyun et al. | 455/575.3 |
| 2011/0241998 | A1 * | 10/2011 | McKinney et al. | 345/168 |
| 2012/0139815 | A1 * | 6/2012 | Aono et al. | 345/1.3 |
| 2012/0147535 | A1 * | 6/2012 | Ahn et al. | 361/679.01 |
| 2012/0149438 | A1 * | 6/2012 | Kwon | 455/566 |

* cited by examiner

*Primary Examiner* — Charles Appiah
*Assistant Examiner* — Edward Zhang
(74) *Attorney, Agent, or Firm* — The Farrell Law Firm, P.C.

(57) ABSTRACT

A portable communication device having a flexible display unit to form a predetermined curvature or be unfolded includes a first housing, second and third housings rotatably coupled to both ends of the first housing, first and second hinge modules provided between the first, second, and third housings to enable the second and third housings to rotate. The flexible display unit is provided on the first, second, and third housings to form a curvature or be unfolded on the first, second, and third housings through rotation together with the second and third housings, first and second curvature space portions formed between the first, second, and third housings allow formation of the curvature of the flexible display unit.

20 Claims, 16 Drawing Sheets

PORTABLE COMMUNICATION DEVICE HAVING FLEXIBLE DISPLAY UNIT

PRIORITY

This application claims priority under 35 U.S.C. §119(a) to a Korean Patent Application filed in the Korean Intellectual Property Office on Apr. 14, 2011 and assigned Ser. No. 10-2011-0034712, which is incorporated herein by reference.

BACKGROUND OF THE INVENTION

1. Field of the Invention

The present invention relates generally to a portable communication device, and more particularly, to a portable communication device including a flexible display unit which can form a predetermined curvature or be unfolded.

2. Description of the Related Art

Generally, the term "portable communication devices" refers to devices by which wireless communication can be performed while the devices are being carried by a user. Portable communication devices include a Hand-Held Phone (HHP), a Cordless Telephone (CT)-2 cellular phone, a digital phone, a Personal Communication System (PCS) phone, and a Personal Digital Assistant (PDA) and are sorted into various types according to their appearances. For example, wireless terminals are sorted into a bar type, a flip type, a folder type, and a sliding type according to their appearances. The above-mentioned portable communication devices generally include an antenna apparatus, a data input/output device, and a data transceiver. For the data input device, a keypad apparatus allowing data to be input through a finger press is generally used.

The display device having a fixed size has been widely used in various fields, but increasing the size of the display device has been restricted in communication devices for to maximize the convenience in the carrying of the portable communication device. To overcome this shortcoming, flexible display technology, which provides convenience during carrying of the portable communication device and variety in size of the display device, has been developed.

The portable communication device having the flexible display unit is easy to carry and the size of the display device may be large, thus satisfying the user's need for a larger display while providing a conveniently sized portable communication device.

In the portable communication device having the flexible display unit, the flexible display unit is withdrawn from a main body of the portable communication device for use or the flexible display unit is provided in a housing of the portable communication device to fold or unfold the flexible display unit when the housing is folded or unfolded by rotation.

However, in the portable communication device including a conventional flexible display unit, when the flexible display unit is folded together with the housing, the flexible display unit is folded like paper such that both side ends are put together. As a result, a folded portion of the flexible display unit is damaged and the flexible display unit, when unfolded, keeps the folded form, often failing to execute its display function.

Therefore, there is a need for a flexible display unit which can form a predetermined curvature when being folded or unfolded by rotation or can be completely unfolded, thereby preventing a folded portion of the flexible display unit from being damaged and deformed.

SUMMARY OF THE INVENTION

Accordingly, an aspect of the present invention is to provide a portable communication device having a flexible display unit which is provided in first, second, and third housings, such that it is configured to form a predetermined curvature when being folded or unfolded by rotation or to be completely unfolded, thereby preventing a folded portion of the flexible display unit from being damaged and deformed and thus improving a function of a product.

Another aspect of the present invention is to provide a portable communication device having a flexible display unit, in which first and second variable movement portions are provided to unfold the flexible display unit through compression and tension when the flexible display unit provided in first, second, and third housings are folded or unfolded by rotation, thereby making it possible to use the flexible display unit in a completely unfolded state and thus preventing damage or product malfunction.

According to an aspect of the present invention, there is provided a portable communication device having a flexible display unit. The portable communication device includes a first housing, second and third housings rotatably coupled to both ends of the first housing, first and second hinge modules provided between the first, second, and third housings to enable the second and third housings to rotate, the flexible display unit provided on the first, second, and third housings to form a curvature or be unfolded on the first, second, and third housings through rotation together with the second and third housings, first and second curvature space portions formed between the first, second, and third housings to allow formation of the curvature of the flexible display unit, and first and second variable movement portions provided on the second and third housings and coupled to both ends of the flexible display unit, the first and second variable movement portions variably moving to form the curvature of the flexible display unit or be unfolded during rotation of the second and third housings.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF EMBODIMENTS OF THE PRESENT INVENTION

Figure 1:
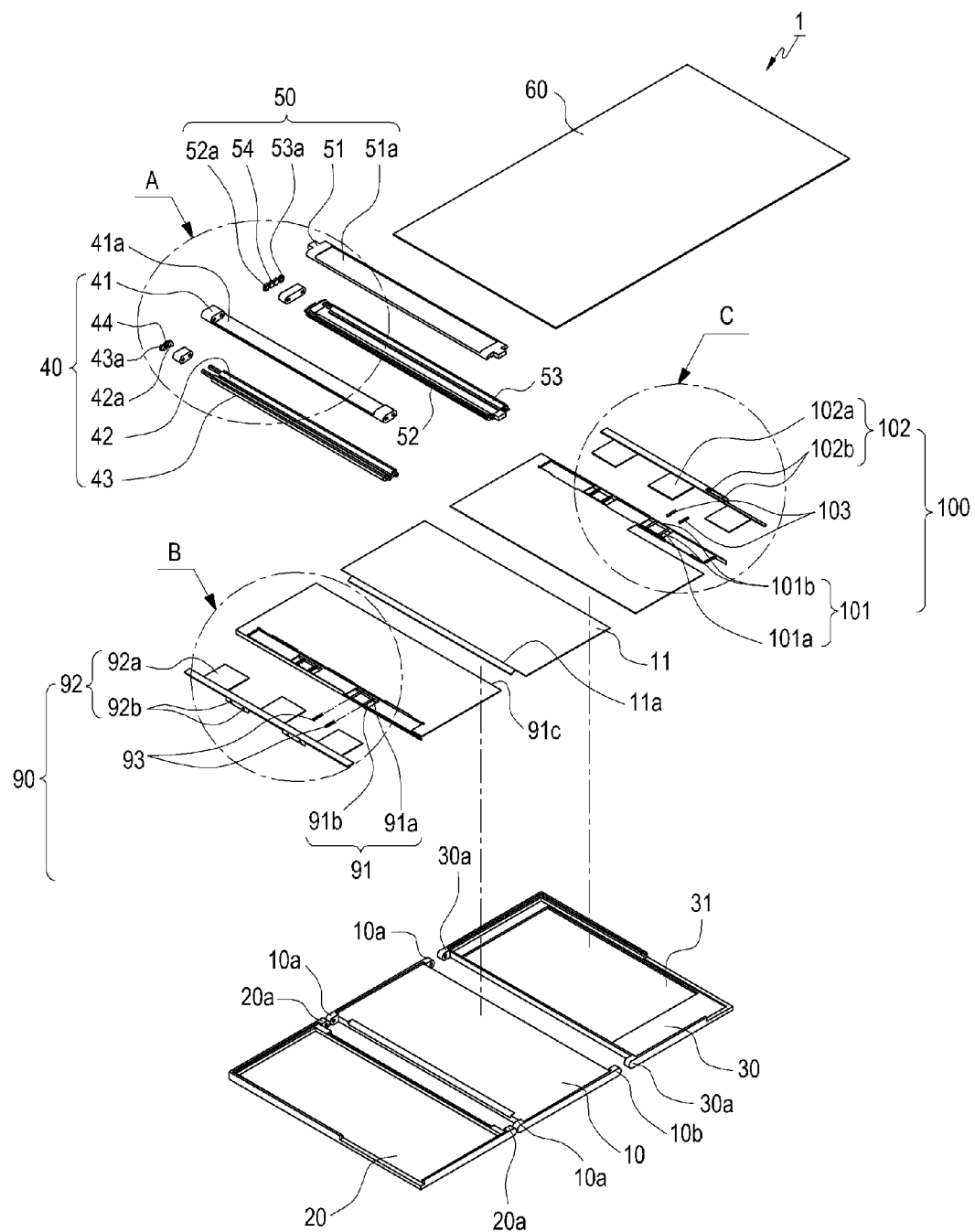
FIG. 1 illustrates an exploded perspective view of a portable communication device having a flexible display unit according to an embodiment of the present invention.

Hereinafter, embodiments of the present invention will be described in detail with reference to the accompanying drawings. The embodiment disclosed in the specification and structures shown in the drawings are merely exemplary ones of the present invention, and it should be understood that various variations capable of substituting for the embodiments may exist at the time of filing the application.

As shown in FIGS. 1 through 18, a portable communication device 1 having includes a first housing 10, a second housing 20, a third housing 30, a first hinge module 40, a second hinge module 50, a flexible display unit 60, a first curvature space portion 70, a second curvature space portion 80, a first variable movement portion 90, and a second variable movement portion 100.

Both ends of the first housing 10 are rotatably coupled with the second housing 20 and the third housing 30 by means of the first hinge module 40 and the second hinge module 50, such that the second housing 20 is rotatably coupled with an end of the first housing 10 by means of the first hinge module 40 and the third housing 30 is rotatably coupled with the other end of the first housing 10 by means of the second hinge module 50. The first hinge module 40 is provided between the first housing 10 and the second housing 20 to allow the second housing 20 to be folded to, or unfolded away from, the first housing 10 by rotating around a first hinge axis A1 and a second hinge axis A2. The second hinge module 50 is provided between the second housing 20 and the third housing 30 to allow the third housing 30 to be folded to, or unfolded from, the second housing 20 by rotating a third hinge axis A3 and a fourth hinge axis A4.

The flexible display unit 60 is provided on inner sides of the first, second, and third housings 10, 20, and 30, respectively, to form a curvature or be unfolded on the first, second, and third housings 10, 20, and 30, respectively, by rotating together with the second and third housings 20 and 30, respectively. The first curvature space portion 70 is formed between the first housing 10 and the second housing 20 to allow the flexible display unit 60 to form a curvature. The first variable movement portion 90 is coupled to both ends of the flexible display unit 60 and is provided on the second housing 20 to variably move together with the flexible display unit 60, thereby allowing the flexible display unit 60 to form a curvature or be unfolded during rotation of the second housing 20. The second variable movement portion 100 is coupled to both ends of the flexible display unit 60 and is provided on the third housing 30 to variably move together with the flexible display unit 60, thereby allowing the flexible display unit 60 to form a curvature or be unfolded during rotation of the third housing 30.

Figure 2:
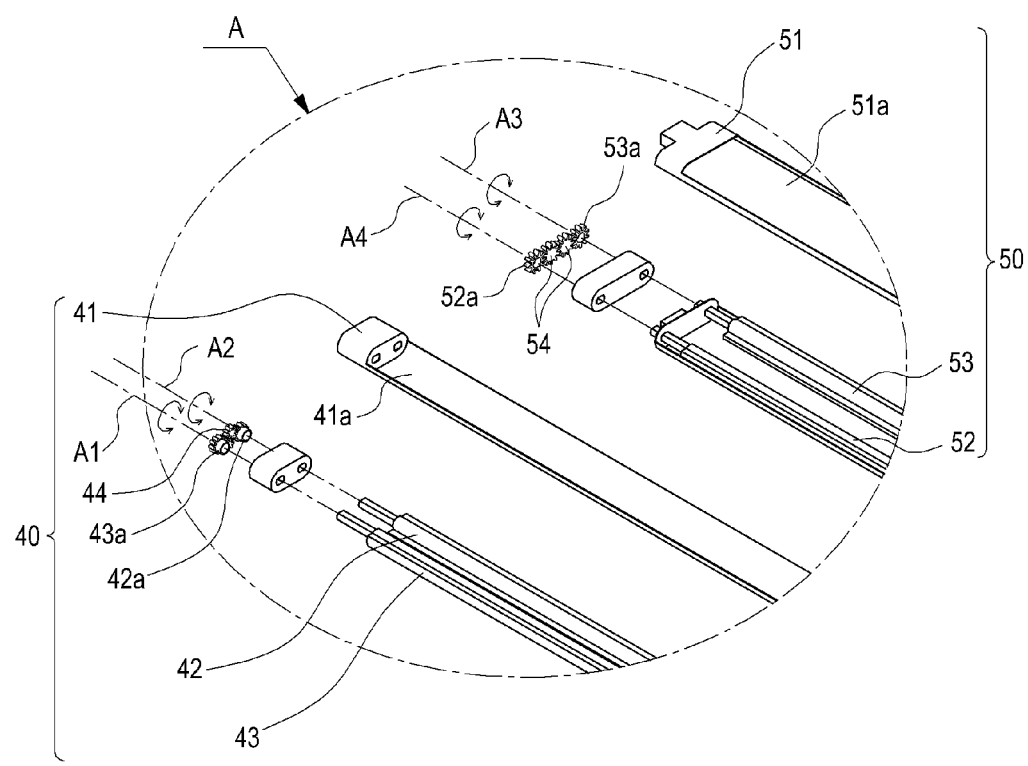
FIG. 2 illustrates an enlarged exploded perspective view of a portion A shown in FIG. 1.
Figure 12:
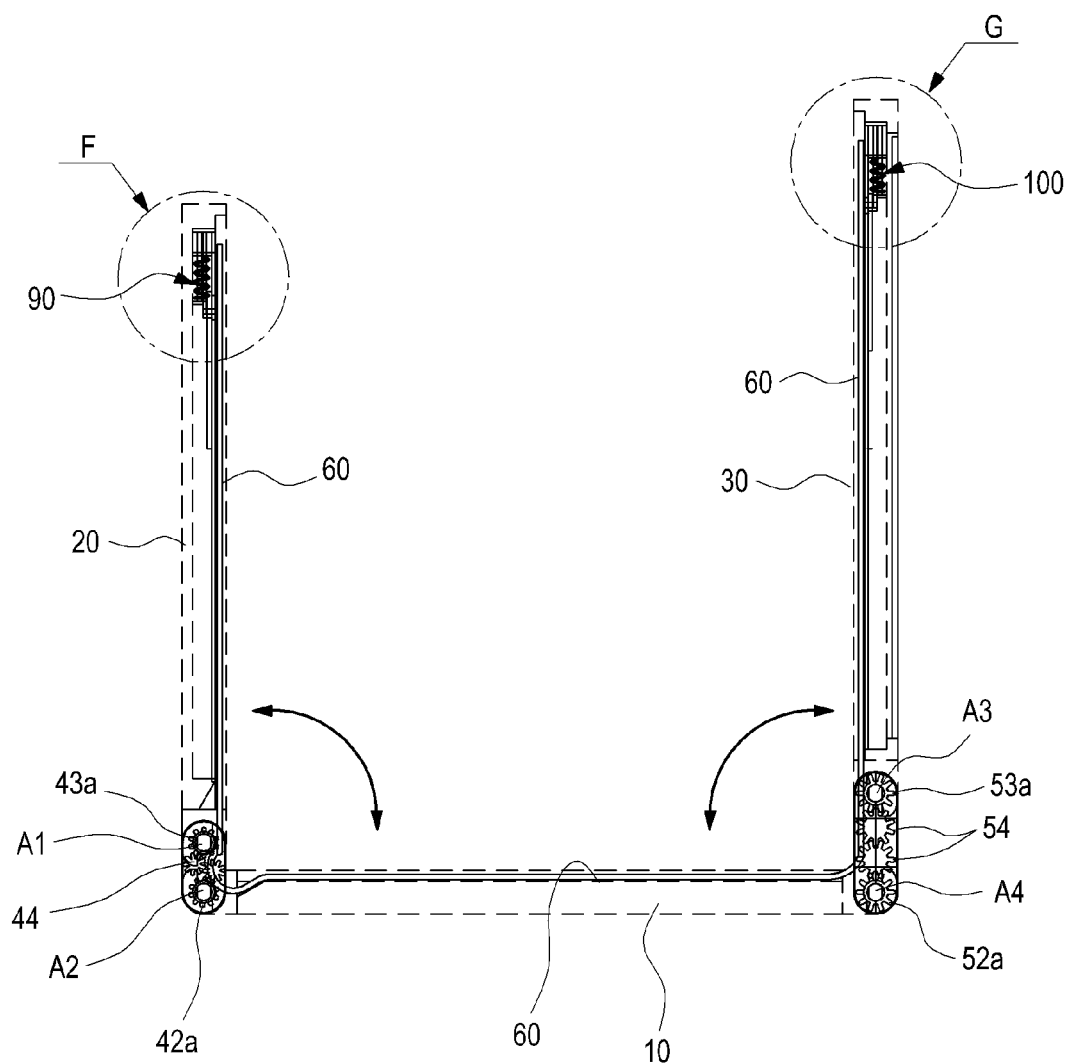
FIG. 12 illustrates a side cross-sectional view showing a state where second and third housings are rotating in a portable communication device having the flexible display unit according to an embodiment of the present invention.

As shown in FIGS. 1, 2, and 12, the first hinge module 40 provides the first hinge axis A1 and the second hinge axis A2, and rotatably couples the second housing 20 to the end of the first housing 10. The first hinge module 40 is a first dual-axis hinge module to allow the flexible display unit 60 to form a curvature or be unfolded according rotation of the second housing 20 from the first housing 10.

As shown in FIGS. 1, 2, and 12, the first dual-axis hinge module 40 includes a hinge housing 41, a first gear shaft 42, a second gear shaft 43, and a plurality of gear cams 44. The hinge housing 41 provides the first curvature space portion 70 and its surface 41a is open to allow formation of the curvature of the flexible display unit 60. The first gear shaft 42 includes a first gear portion 42a, and is provided on the hinge housing 41 to be rotatably coupled to a pair of hinge arms 10a provided on the first housing 10. The second gear shaft 43 includes a second gear portion 43a, and is provided on the hinge housing 41 to be rotatably coupled to a pair of hinge arms 20a provided in the second housing 20. The gear cams 44 are provided on the hinge housing 41, such that the first gear portion 42a and the second gear portion 43a can rotate while being engaged with each other during rotation of the second housing 20.

Figure 8:
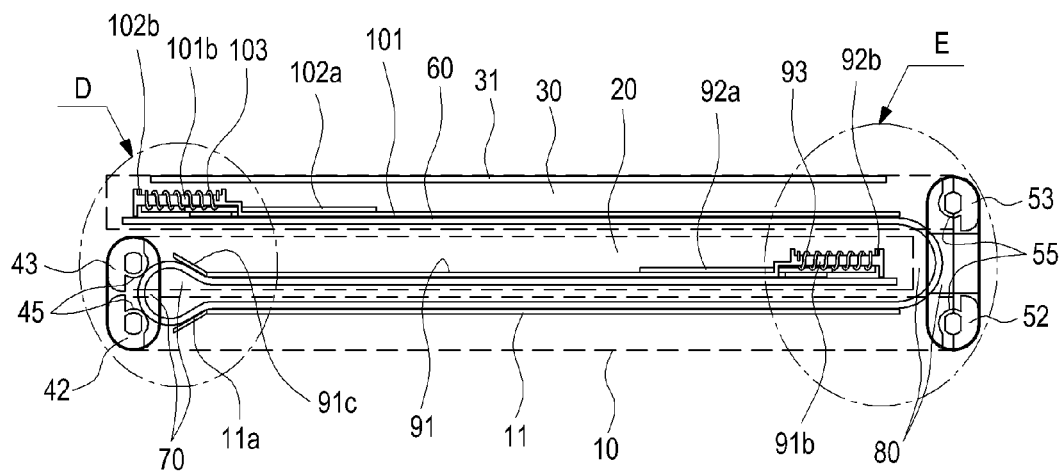
FIG. 8 illustrates a side cross-sectional view showing a state where a flexible display unit is coupled in a portable communication device having the flexible display unit according to an embodiment of the present invention.
Figure 9:
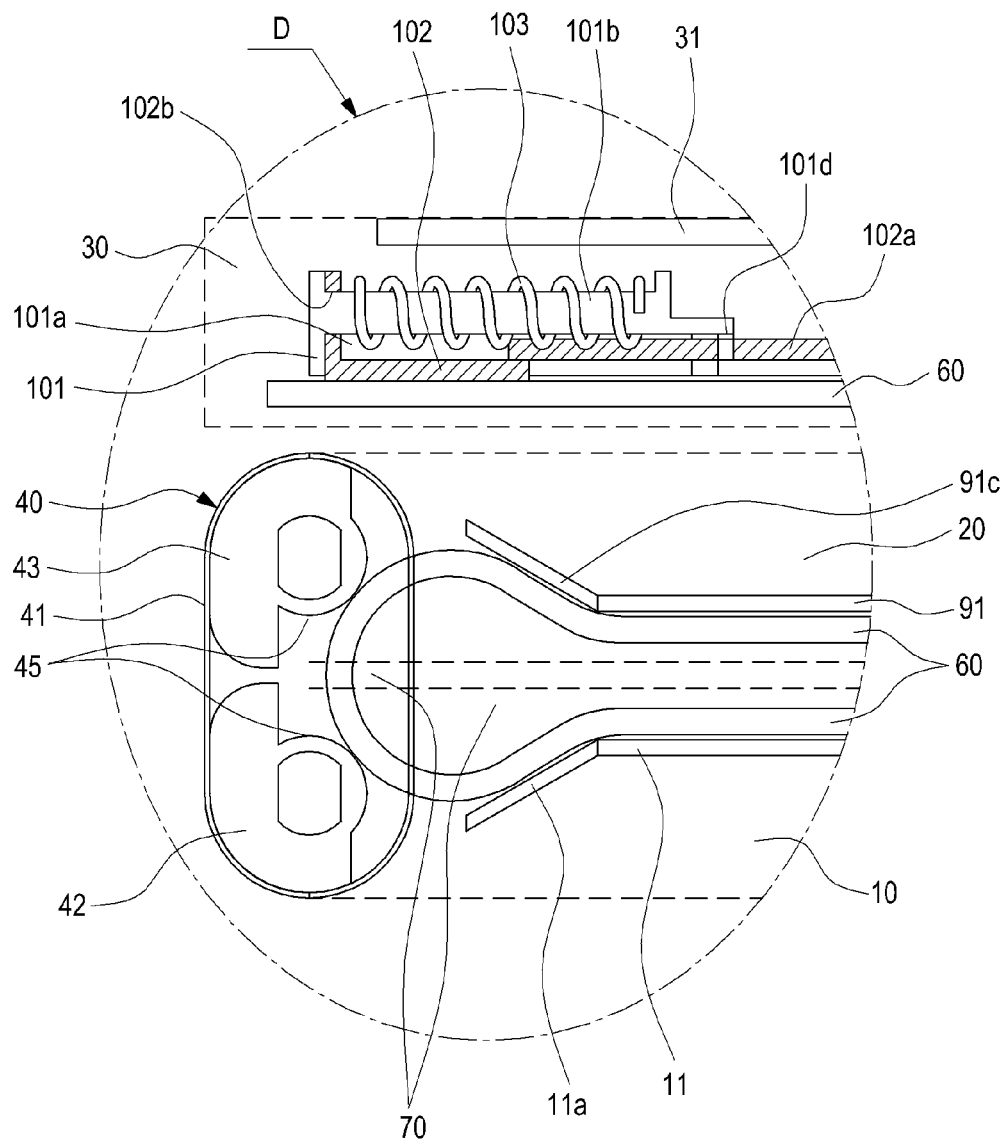
FIG. 9 illustrates an enlarged exploded perspective view of a portion D shown in FIG. 8.

As shown in FIGS. 8 and 9, the first gear shaft 42 and the second gear shaft 43 have space grooves 45 to provide the first curvature space portion 70.

As shown in FIGS. 1, 2, and 12, the second hinge module 50 provides the third hinge axis A3 and the fourth hinge axis A4, and rotatably couples the third housing 30 to the other end of the first housing 10. The second hinge module 50 is a second dual-axis hinge module to allow the flexible display unit 60 to form a curvature or be unfolded according to the rotation of the third housing 30 from the second housing 20.

As shown in FIGS. 1, 2, and 12, the second dual-axis hinge module 50 includes a hinge housing 51, a first gear shaft 52, a second gear shaft 53, and a plurality of gear cams 54. The hinge housing 51 provides the second curvature space portion 80 and its surface 51a is open to allow formation of the curvature of the flexible display unit 60. The first gear shaft 52 includes a first gear portion 52a, and is provided on the hinge housing 51 to be rotatably coupled to the pair of hinge arms 10a provided on the first housing 10. The second gear shaft 53 includes a second gear portion 53a, and is provided on the hinge housing 51 to be rotatably coupled to a pair of hinge arms 30a provided in the third housing 30. The gear cams 54 are provided on the hinge housing 51, such that the first gear portion 52a and the second gear portion 53a can rotate while being organically engaged with each other during rotation of the third housing 30.

As shown in FIGS. 8 and 9, the first gear shaft 52 and the second gear shaft 53 have space grooves 55 to provide the second curvature space portion 80.

As shown in FIGS. 1, 8, and 9, the first curvature space portion 70 is formed between the end of the first housing 10 and the end of the second housing 20 and in the first hinge module 40 to allow formation of the curvature of the flexible display unit 60, and the second curvature space portion 80 is formed between the end of the first housing 10 and the end of the third housing 30 and in the second hinge module 50 to allow formation of the curvature of the flexible display unit 60.

As shown in FIGS. 1, 8 through 10, and 16, the first housing 10 is provided with a first frame 11 having an inclined portion 11a to form the first curvature space portion 70.

As shown in FIGS. 1, 3, 10, and 12 through 18, the first variable movement portion 90 includes a second frame 91 having an inclined portion 91c, a movement portion 92, and at least one elastic member 93. The second frame 91 is provided in the second housing 20 to support movement of the movement portion 92 which is movably coupled with the second frame 91. The movement portion 92 is coupled to an end of the flexible display unit 60, such that the movement portion 92 moves from the second frame 91 during rotation of the second housing 20 to allow formation of the curvature of the flexible display unit 60 or to hold and draw the flexible display unit 60 in order to unfold the flexible display unit 60. The elastic members 93 are provided on the second frame 91 to compress or stretch the movement portion 92.

As shown in FIGS. 1, 3, 10, and 13, the movement portion 92 includes at least one movement support plate 92a and at least one movement coupling portion 92b. The movement support plates 92a are coupled to guide holes 91d formed in the second frame 91 to guide and support movement of the movement portion 92, and the movement coupling portions 92b are formed in the movement portion 92 to be coupled with elastic coupling portions 91b formed in the second frame 91 by passing the elastic coupling portions 91b therethrough and to move along the elastic coupling portions 91b. In the second frame 91 is formed at least one elastic space 91a to receive the elastic members 93. In the elastic spaces 91a are formed the elastic coupling portions 91b to be coupled with the elastic members 93.

As shown in FIGS. 1, 4, 8, 9, and 12 through 18, the second variable movement portion 100 includes a third frame 101, a movement portion 102, and at least one elastic member 103. The third frame 101 is provided in the third housing 30 to support movement of the movement portion 102, and the movement portion 102 is movably coupled to the third frame 101. The movement portion 102 is coupled to the other end of the flexible display unit 60, such that the movement portion 102 moves from the third frame 101 during rotation of the third housing 30 to allow formation of the curvature of the flexible display unit 60 or to hold and draw the flexible display unit 60 in order to unfold the flexible display unit 60. The elastic members 103 are provided on the third frame 101 to compress or stretch the movement portion 102.

As shown in FIGS. 1, 4, 5, 6, 8, 9, 12, and 14, the movement portion 102 includes at least one movement support plate 102a and at least one movement coupling portion 102b. The movement support plates 102a are coupled to guide holes 101d formed in the third frame 101 to guide and support movement of the movement portion 102, and the movement coupling portions 102b are formed in the movement portion 102 to be coupled with elastic coupling portions 101b formed in the third frame 101 by passing the elastic coupling portions 101b therethrough and to move along the elastic coupling portions 101b. In the third frame 101 is formed at least one elastic space 101a to receive the elastic members 103. In the elastic spaces 101a are formed the elastic coupling portions 101b to be coupled with the elastic members 103.

Figure 6:
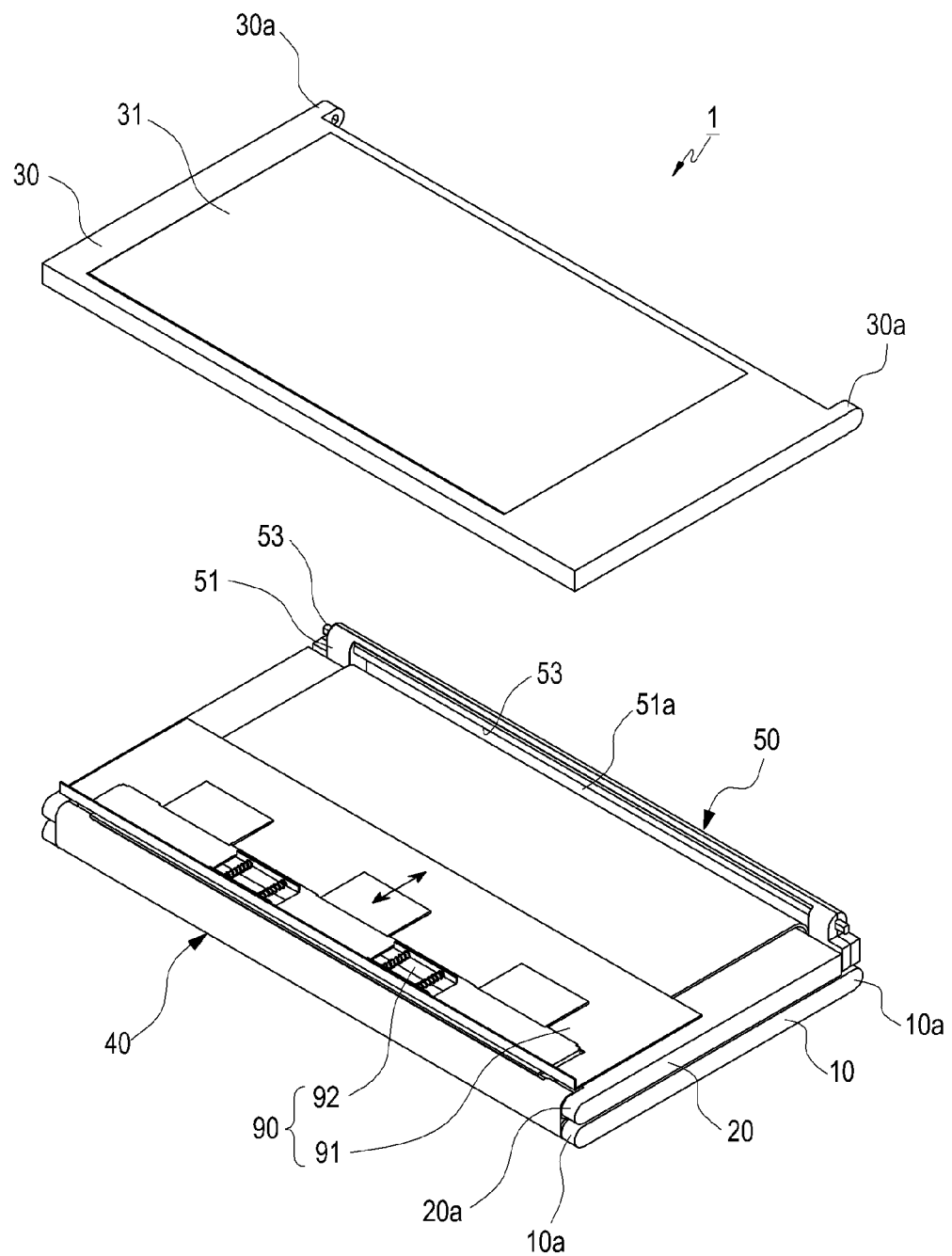
FIG. 6 illustrates an exploded perspective view showing a state before a third housing is coupled in a portable communication device having a flexible display unit according to an embodiment of the present invention.
Figure 7:
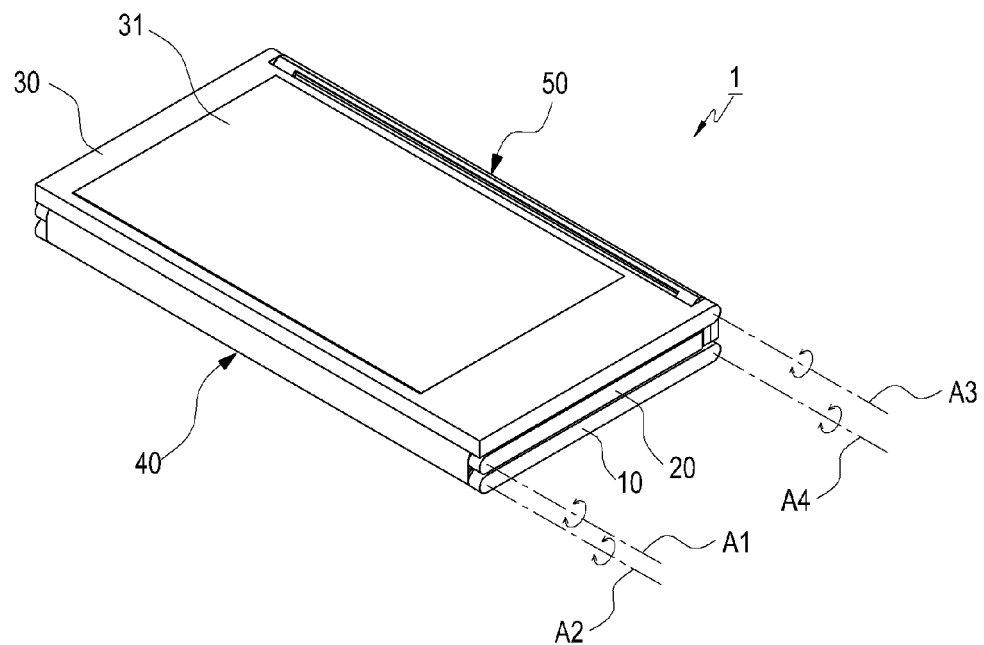
FIG. 7 illustrates a perspective view showing a state where a flexible display unit is coupled in a portable communication device having the flexible display unit according to an embodiment of the present invention.

As shown in FIGS. 1, 6, and 7, on outer sides of the first, second, and third housings 10, 20, and 30, respectively, are provided input/output devices which include at least one of a display unit 31, a touch screen, a keypad, a keyboard, a navigation key, and QWERTY keys.

As shown in FIGS. 1 through 18, the portable communication device 1 includes the first, second, and third housings 10, 20, and 30, respectively, the first and second hinge modules 40 and 50, the flexible display unit 60, the first and second curvature space portions 70 and 80, and the first and second variable movement portions 90 and 100.

As shown in FIGS. 1 and 2, the first and second hinge modules 40 and 50 are first and second dual-axis hinge modules which provide the first, second, third, and fourth hinge axes A1, A2, A3, and A4, respectively. The first dual-axis hinge module 40 includes the hinge housing 41 having the open side 41a, the first and second gear shafts 42 and 43, and the plurality of gear cams 44.

As shown in FIGS. 1, 2, 12, and 16, the first gear shaft 42 is coupled with the pair of hinge arms 10a provided in the end of the first housing 10, and the second gear shaft 43 is coupled with the pair of hinge arms 20a provided in the second housing 20. The gear cams 44 are rotatably engaged with the first and second gear portions 42a and 43a provided in the first and second gear shafts 42 and 43.

As shown in FIGS. 1 and 2, the second dual-axis hinge module 50 includes the hinge housing 51 having the open side 51a, the first and second gear shafts 52 and 53, and the plurality of gear cams 54. In this state, the first gear shaft 52 is coupled with the pair of hinge arms 10a formed in the other end of the first housing 10 and the second gear shaft 53 is coupled with the pair of hinge arms 30a provided in the third housing 30. The gear cams 54 are rotatably engaged with the first and second gear portions 52a and 53a provided in the first and second gear shafts 52 and 53.

Figure 5:
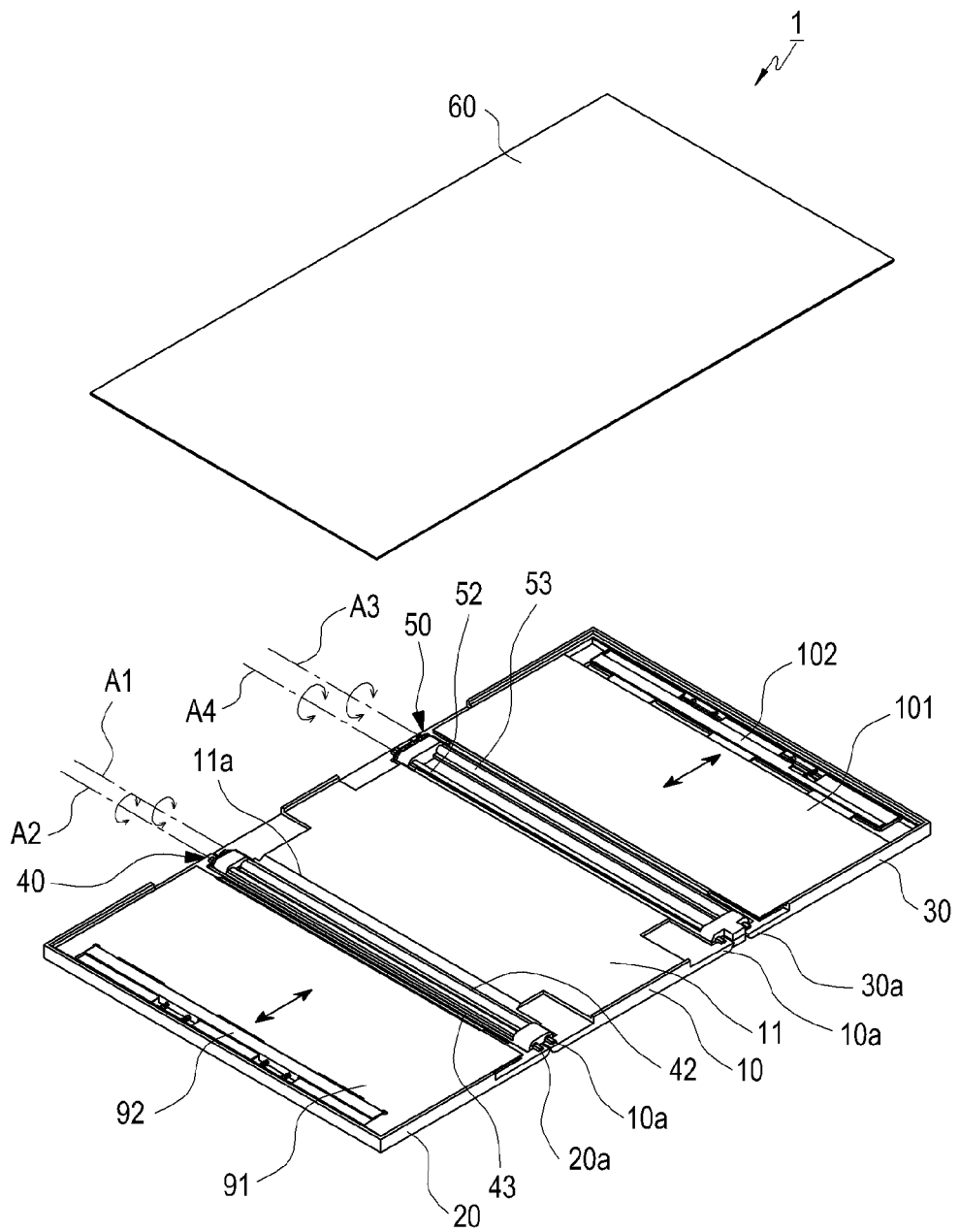
FIG. 5 illustrates an exploded perspective view showing a state before a flexible display unit is coupled in a portable communication device having the flexible display unit according to an embodiment of the present invention.

As shown in FIGS. 1 and 5, the first housing 10 is provided with the first frame 11 having the inclined portion 11a.

Figure 3:
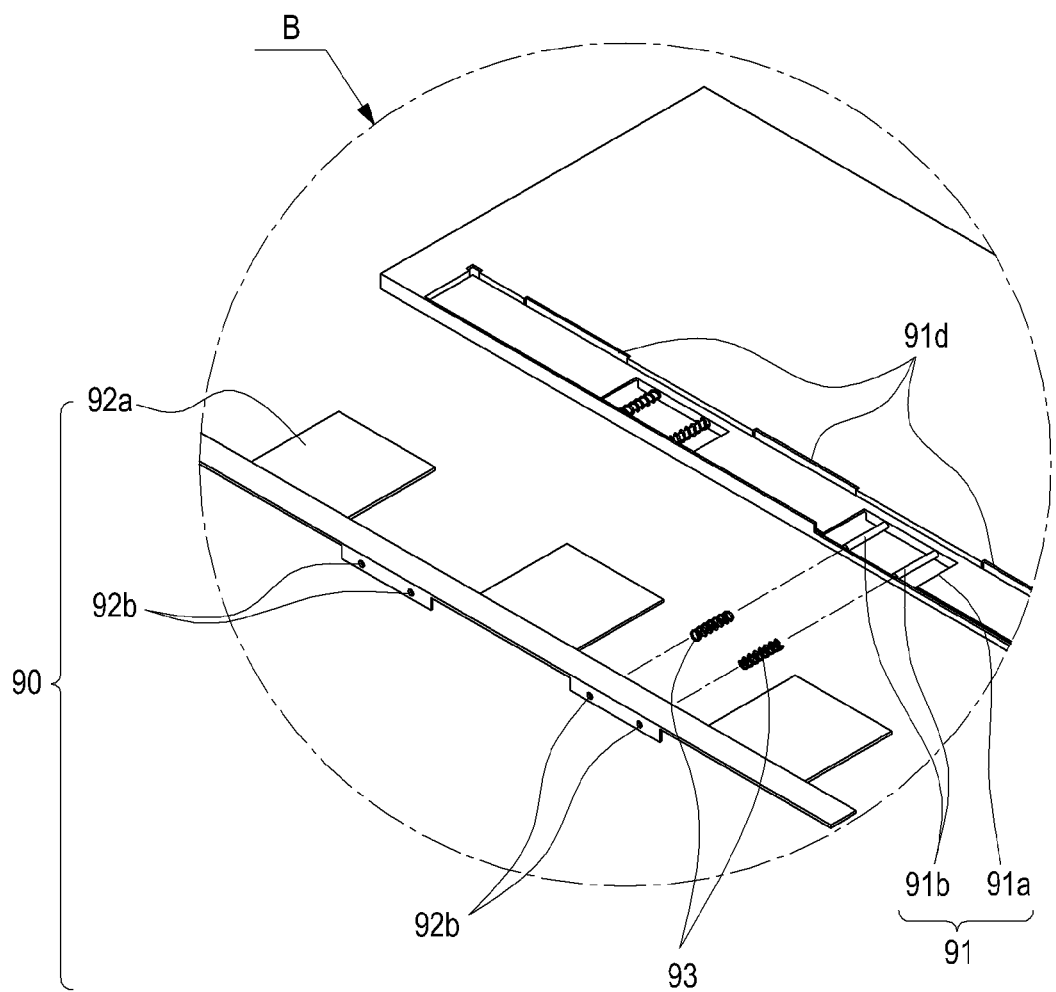
FIG. 3 illustrates an enlarged exploded perspective view of a portion B shown in FIG. 1.

As shown in FIGS. 1 and 3, the first variable movement portion 90 includes the second frame 91 having the inclined portion 91c, the movement portion 92, and the at least one elastic members 93. The at least one movement support plates 92a formed on the movement portion 92 are coupled to the guide holes 91d of the second frame 91.

As shown in FIGS. 1, 3, 9, and 10, the movement coupling portions 92b of the movement portion 92 are coupled to the elastic coupling portions 91b to pass the elastic coupling portions 91b, formed in the second frame 91, there through, and to move along the elastic coupling portions 91b. The elastic members 93 are coupled to the elastic coupling portions 91b.

In this state, as shown in FIGS. 1, 3, and 5, the second housing 20 is provided with the second frame 91, such that the second frame 91 is coupled to the inner side of the second housing 20.

Figure 4:
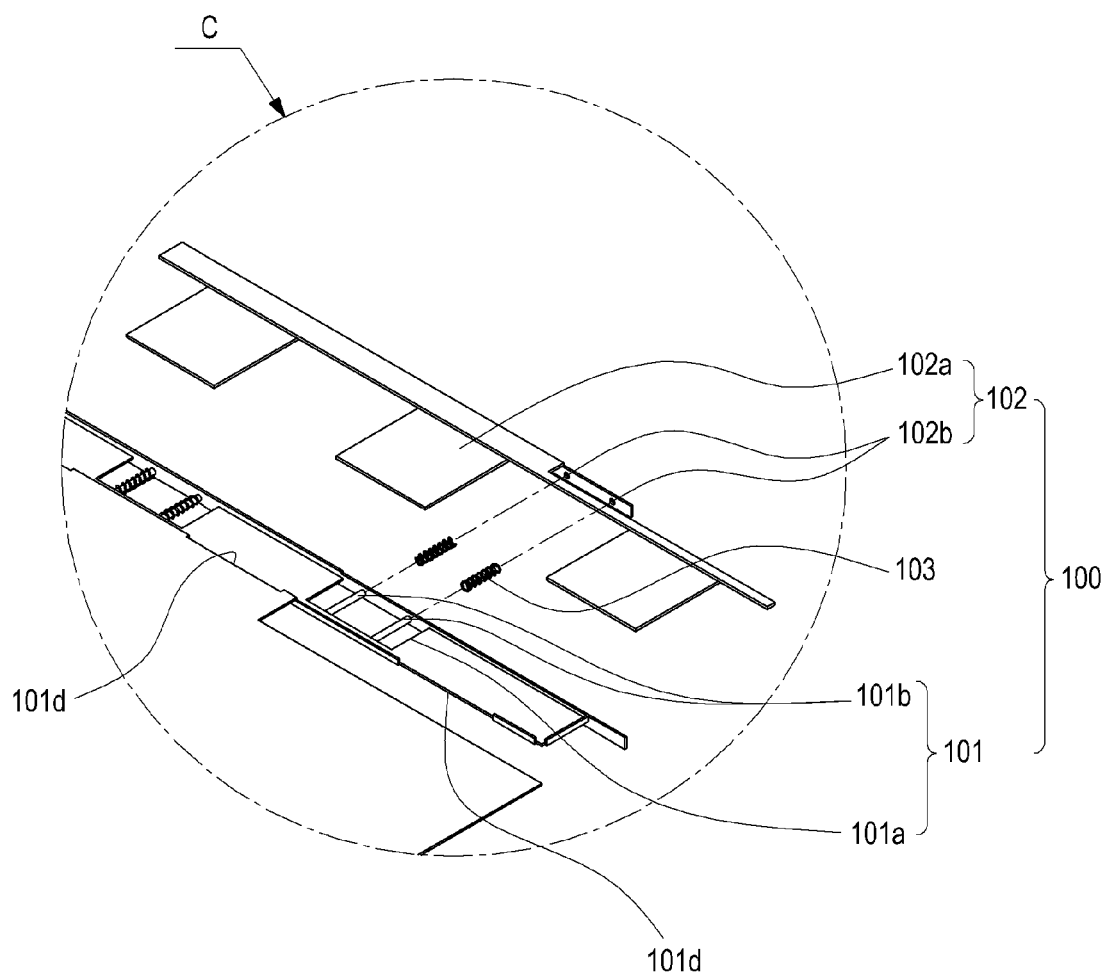
FIG. 4 illustrates an enlarged exploded perspective view of a portion C shown in FIG. 1.

As shown in FIGS. 1 and 4, the second variable movement portion 100 includes the third frame 101, the movement portion 102, and the at least one elastic members 103. The at least one movement support plates 102*a* formed on the movement portion 102 are coupled to the guide holes 101*d* of the third frame 101.

As shown in FIGS. 1, 3, 8, and 9, the movement coupling portions 102*b* of the movement portion 102 are coupled to the elastic coupling portions 101*b* to pass the elastic coupling portions 101*b*, formed in the third frame 101, therethrough and to move along the elastic coupling portions 101*b*. The elastic members 103 are coupled to the elastic coupling portions 101*b*.

In this state, as shown in FIG. 5, the third housing 30 is provided with the third frame 101, such that the third frame 101 is coupled to the inner side of the third housing 30.

As shown in FIGS. 5 and 6, the flexible display unit 60 is provided on the first, second, and third frames 11, 91, and 101, respectively, of the first, second, and third housings 10, 20, and 30, respectively. Both ends of the flexible display unit 60 are coupled to the second and third frames 91 and 101, respectively, of the first and second variable movement portions 90 and 100, respectively.

Figure 11:
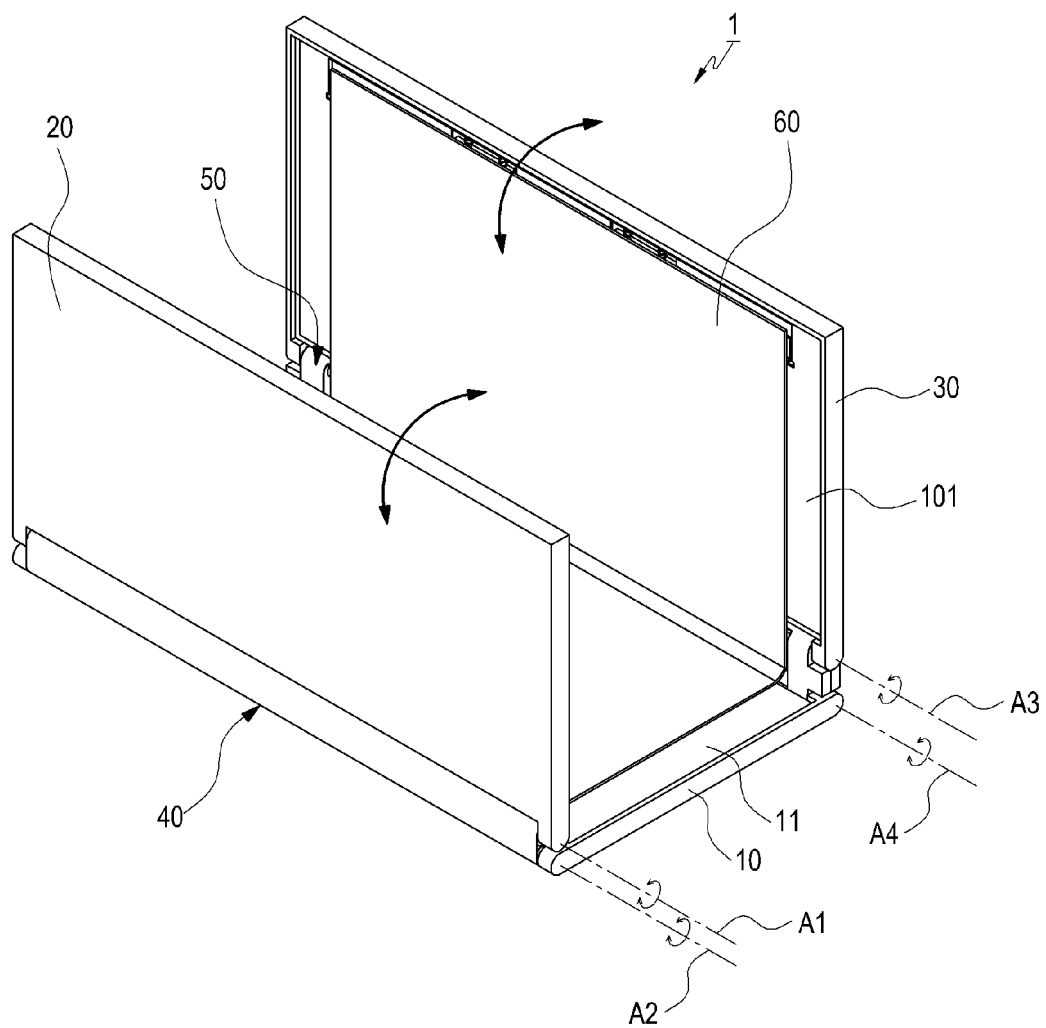
FIG. 11 illustrates a perspective view showing a state where second and third housings are rotating in a portable communication device having the flexible display unit according to an embodiment of the present invention.

Herein, as shown in FIGS. 7, 8, and 11, the second housing 20 is folded to the first housing 10 by rotating around the first and second hinge axes A1 and A2, respectively, of the first dual-axis hinge module 40. In this state, the third housing 30 is folded to the second housing 20 by rotating around the third and fourth hinge axes A3 and A4, respectively, of the second dual-axis hinge module 50. The flexible display unit 60 is folded by rotating together with rotation of the second and third housings 20 and 30.

As shown in FIGS. 8 and 9, between the first housing 10 and the second housing 20 is formed the first curvature space portion 70, which allows rotation of the second housing 20 therein, by means of the space grooves 45 formed in the first and second gear shafts 42 and 43, respectively, of the first dual-axis hinge module 40. Into the first curvature space portion 70 may be inserted the curvature of the flexible display unit 60, which is formed by rotation of the flexible display unit 60. The inclined portion 11*a* of the first frame 11 of the first housing 10 and the inclined portion 91*c* of the second frame 91 guide the flexible display unit 60 to form the curvature of the flexible display unit 60.

Figure 10:
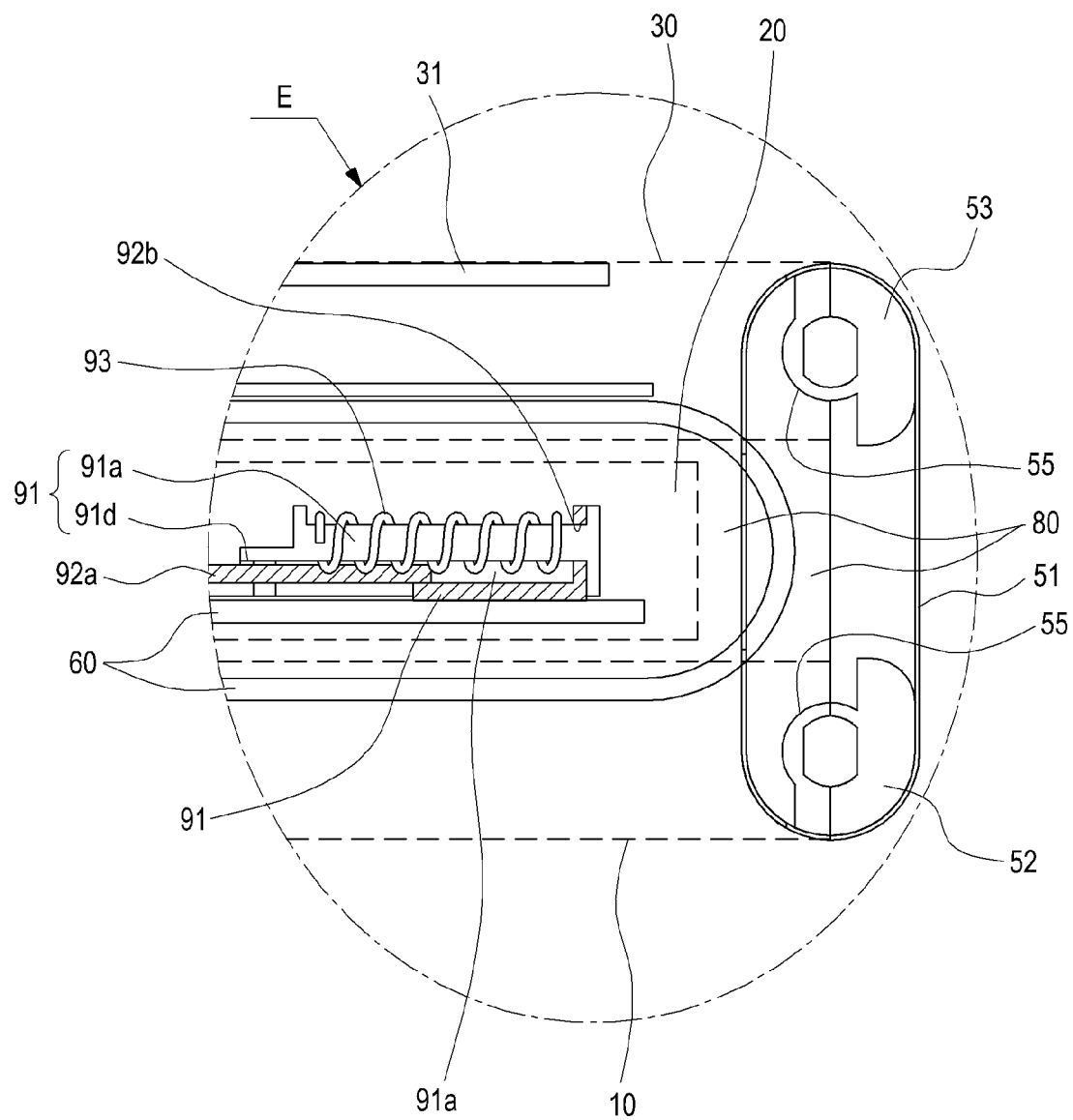
FIG. 10 illustrates an enlarged exploded perspective view of a portion E shown in FIG. 8.

As shown in FIGS. 8 and 10, between the first housing 10 and the third housing 30 is formed the second curvature space portion 80, which allows rotation of the third housing 30 therein, by means of the space grooves 55 formed in the first and second gear shafts 52 and 53, respectively, of the second dual-axis hinge module 50. Into the first curvature space portion 80 may be inserted the curvature of the flexible display unit 60, which is formed by rotation of the flexible display unit 60.

As such, even when the second housing 20 and the third housing 30 are folded to each other by rotation, the predetermined curvature of the flexible display unit 60 can be formed by means of the first and second curvature space portions 70 and 80, respectively, formed in the first, second, and third housings 10, 20, and 30, respectively, thereby preventing damage and deformation due to folding of the flexible display unit 60.

As shown in FIGS. 7 and 11, to unfold the second housing 20 and the third housing 30, the third housing 30 is erected by rotating 90° in a direction away from the second housing 20.

Figure 14:
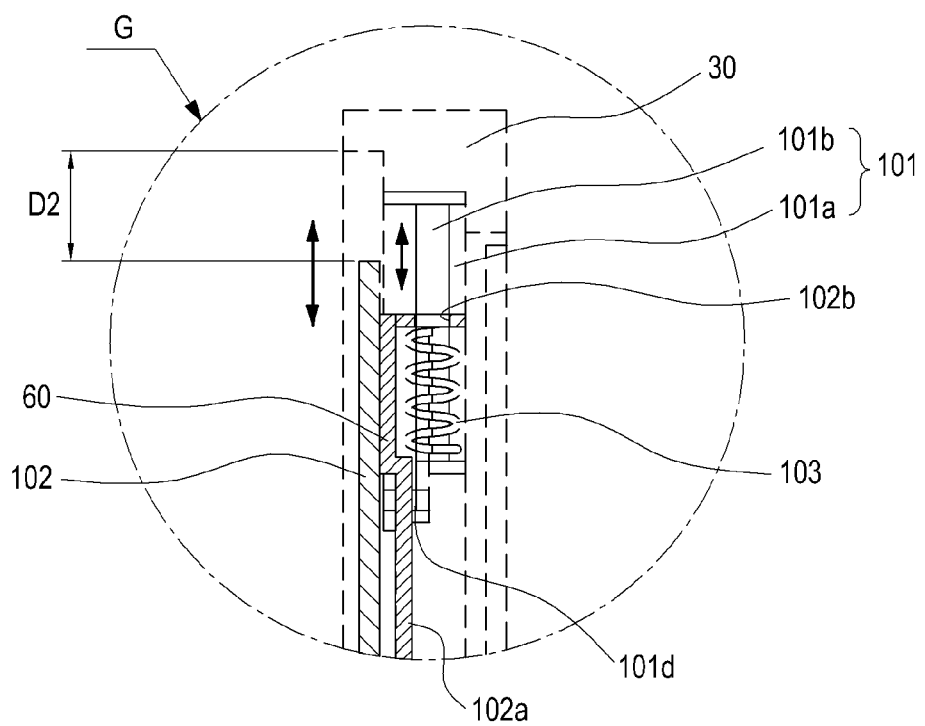
FIG. 14 illustrates an enlarged exploded perspective view of a portion G shown in FIG. 12.

As shown in FIGS. 12 and 14, the third housing 30 rotates around the third hinge axis A3 of the second dual-axis hinge module 50 and the flexible display unit 60 also rotates together with the third housing 30. The other end of the flexible display unit 60 is drawn toward the inner side of the third housing 30, and the movement portion 102 of the second variable movement portion 100 also moves together with the other end of the flexible display unit 60. The movement portion 102 moves from the third frame 101. In this case, the other end of the flexible display unit 60 moves by a predetermined distance D2, together with the end of the third housing 30.

As shown in FIG. 14, as the movement portion 102 of the second variable movement portion 100 moves, the elastic members 103 provided in the third frame 101 are compressed.

In this state, as shown in FIG. 12, the curvature of the flexible display unit 60 is unfolded at a predetermined angle through rotation of the third housing 30.

As shown in FIGS. 11 and 12, when the third housing 30 is erected, the second housing 20 is erected by rotating 90° in a direction away from the first housing 10.

Figure 13:
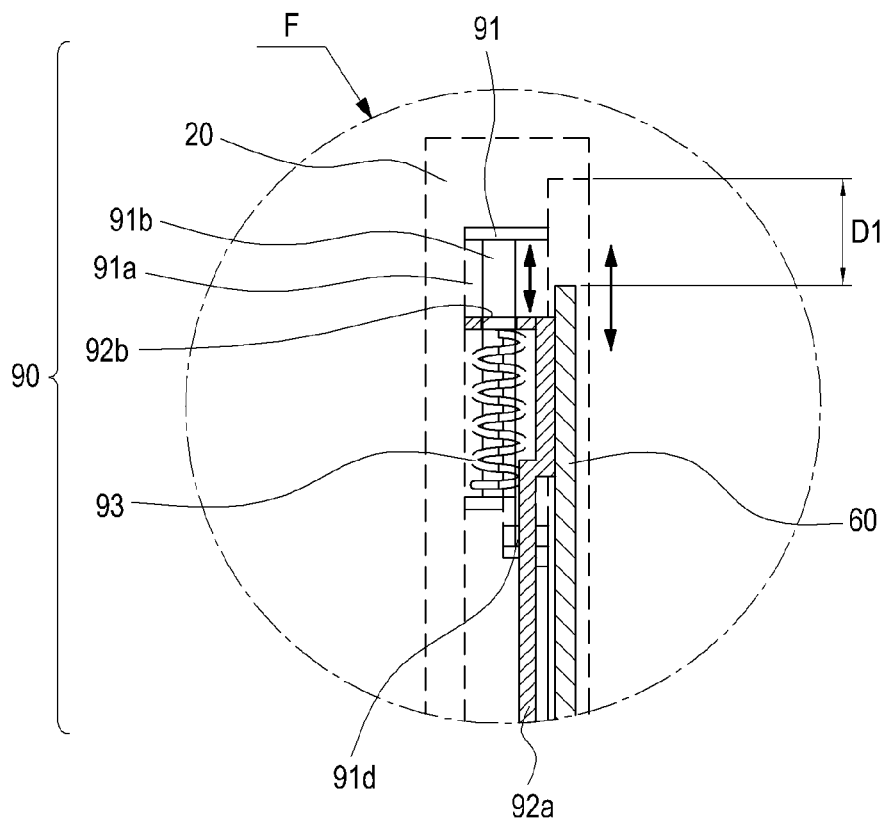
FIG. 13 illustrates an enlarged exploded perspective view of a portion F shown in FIG. 12.

In this state, as shown in FIGS. 12 and 13, the second housing 20 rotates around the first hinge axis A1 of the first dual-axis hinge module 40 and the flexible display unit 60 also rotates together with the second housing 20. The end of the flexible display unit 60 is drawn toward the inner side of the second housing 20, and the movement portion 92 of the first variable movement portion 90 also moves together with the end of the flexible display unit 60. In this case, the end of the flexible display unit 60 moves by a predetermined distance D1, together with the end of the second housing 20.

As shown in FIG. 13, as the movement portion 92 of the first variable movement portion 90 moves, the elastic members 93 provided in the second frame 91 are compressed.

As shown in FIG. 12, the curvature of the flexible display unit 60 is unfolded at a predetermined angle through rotation of the second housing 20.

Figure 15:
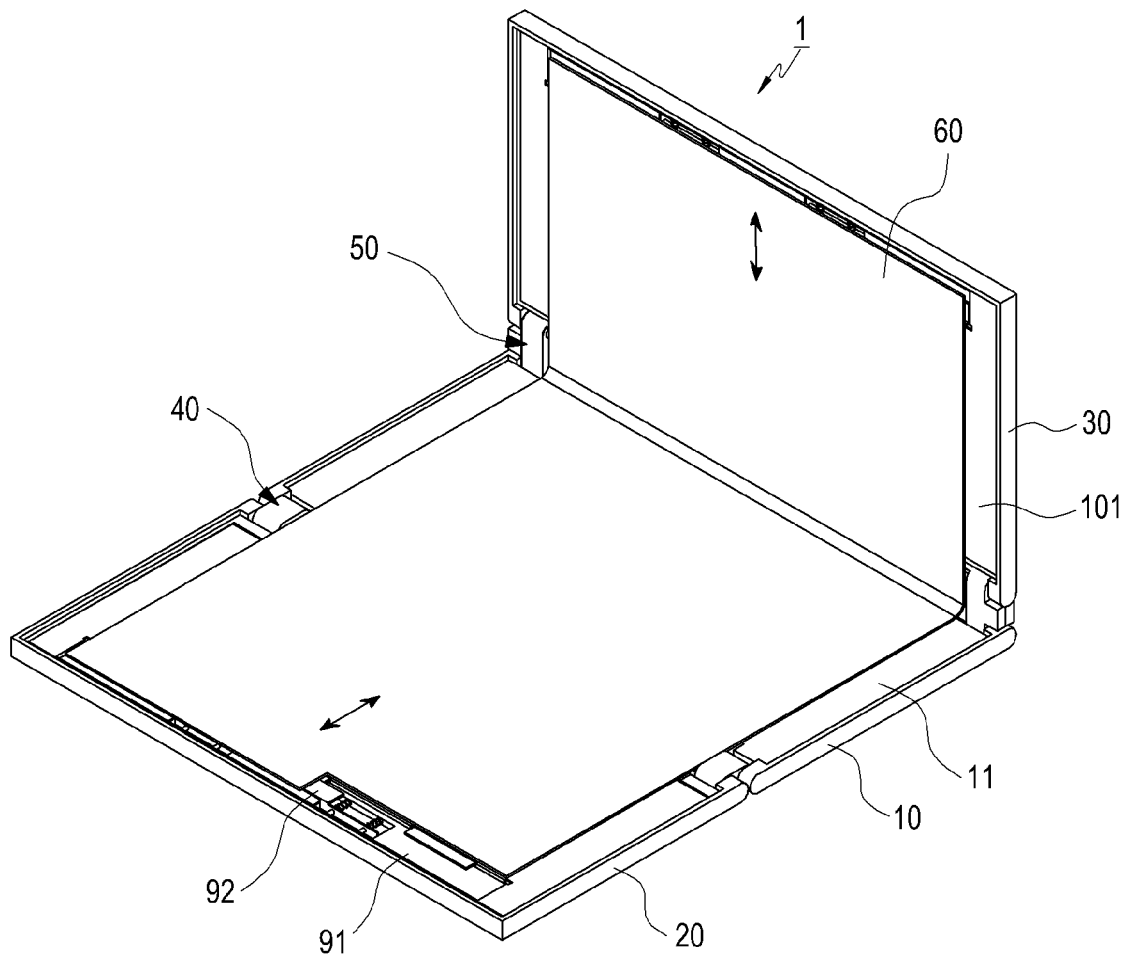
FIG. 15 illustrates a perspective view showing a state where a second housing rotates in a portable communication device having the flexible display unit according to an embodiment of the present invention.
Figure 16:
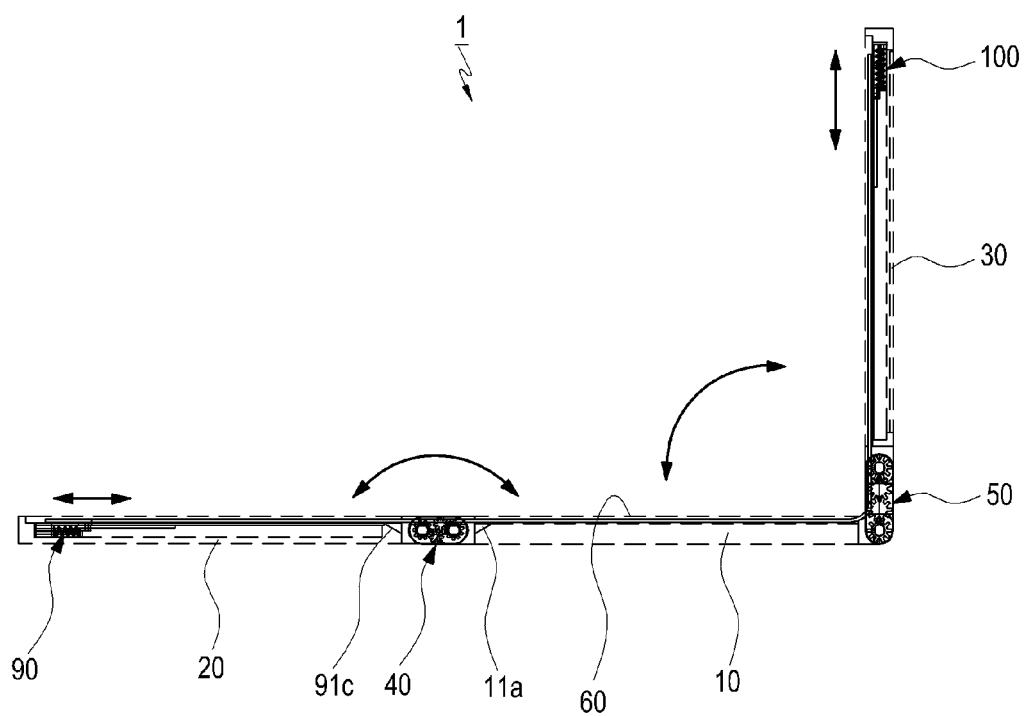
FIG. 16 illustrates a side cross-sectional view showing a state where a second housing rotates in a portable communication device having the flexible display unit according to an embodiment of the present invention.

In this state, as shown in FIG. 15, the second housing 20 rotates 180° around the second hinge axis A2 of the first dual-axis hinge module 40. The flexible display unit 60 rotates 180° together with the second housing 20, and is thus completely unfolded.

As shown in FIGS. 12 and 13, the end of the flexible display unit 60 is drawn toward the inner side of the second housing 20 by means of the movement portion 92 of the first variable movement portion 90, thus compressing the elastic members 93. The curvature of the flexible display unit 60 is completely unfolded through rotation of the second housing 20.

Figure 17:
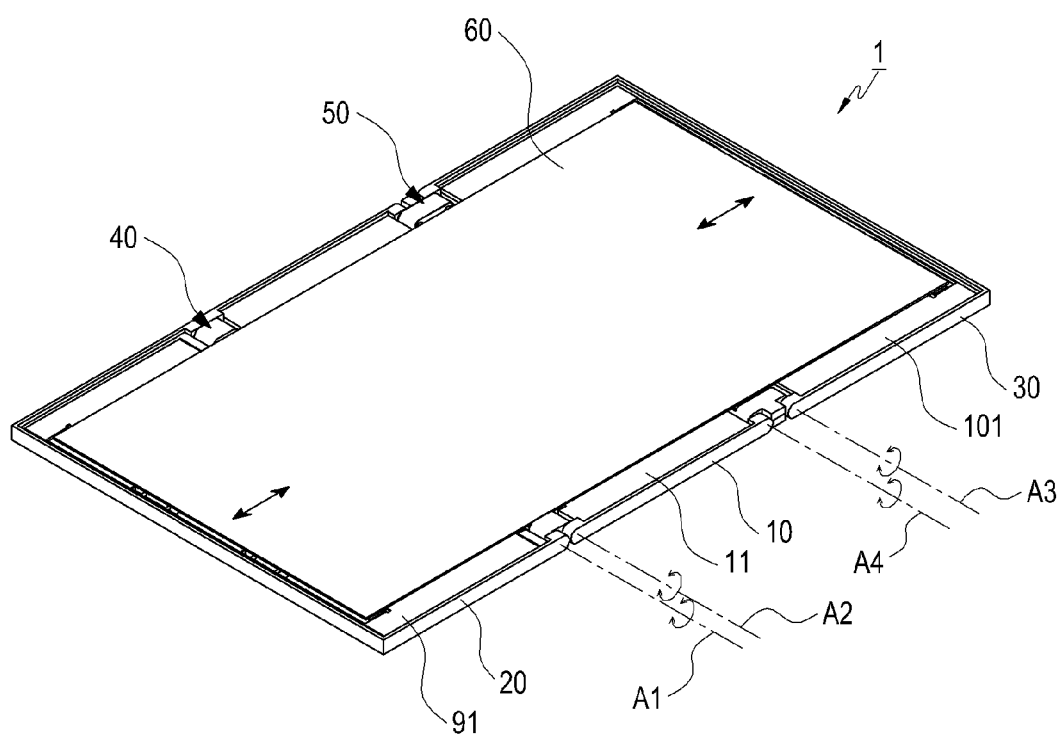
FIG. 17 illustrates a perspective view showing a state where a third housing rotates in a portable communication device having the flexible display unit according to an embodiment of the present invention.
Figure 18:
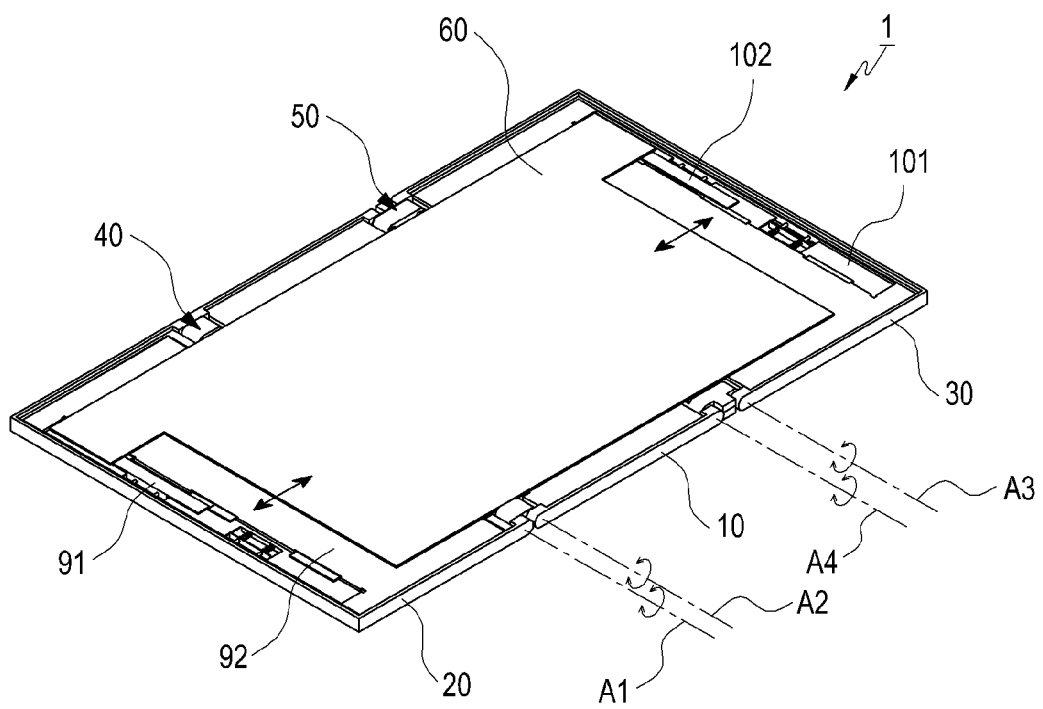
FIG. 18 illustrates a perspective view showing a state where second and third housings rotate in a portable communication device having the flexible display unit according to an embodiment of the present invention.

In this state, as shown in FIGS. 17 and 18, the third housing 30 rotates 180° around the fourth hinge axis A4 of the second dual-axis hinge module 50. At this time, the flexible display unit 60 rotates 180° together with the third housing 30, and is thus completely unfolded.

As shown in FIGS. 12 and 14, the end of the flexible display unit 60 is drawn toward the inner side of the third housing 30 by means of the movement portion 102 of the second variable movement portion 100, thus compressing the elastic members 103.

In this state, as shown in FIGS. 17 and 18, the curvature of the flexible display unit 60 is completely unfolded through rotation of the third housing 30.

As such, by rotating the second and third housings 20 and 30 by 180°, the first, second, and third housings 10, 20, and 30, respectively, are unfolded, and the predetermined curvature of the flexible display unit 60 is completely unfolded. Deformation of the curvature of the flexible display unit 60 is thus prevented, which facilitates a user's touch and enjoyment of a product, and prevents malfunctioning of the product.

Herein, as shown in FIGS. 7 and 8, to fold the second housing 20 and the third housing 30 again, the second housing 20 is erected by rotating 90° around the second hinge axis A2 of the first dual-axis hinge module 40 and then the second housing 20 is folded to the first housing 10 by rotating in a direction toward the first housing 10 around the first hinge axis A1 of the first dual-axis hinge module 40.

At this time, as shown in FIGS. 8 and 9, the flexible display unit 60 forms the predetermined curvature again and the predetermined curvature is inserted into the first curvature space portion 70 formed in the first and second housings 10 and 20.

As shown in FIG. 13, as the compressed elastic members 93 are stretched, the movement portion 92 of the first variable movement portion 90 moves toward the outer side of the second housing 20 and the end of the flexible display unit 60 moves back to the original position by the predetermined distance D1.

In this state, as shown in FIGS. 7, 8, and 12, the third housing 30 is erected by rotating 90° around the fourth hinge axis A4 of the second dual-axis hinge module 50, and then the third housing 30 is folded to the second housing 20 by rotating in a direction toward the second housing 20 around the third hinge axis A3 of the second dual-axis hinge module 50.

At this time, as shown in FIGS. 8 and 10, the flexible display unit 60 forms the predetermined curvature again and the predetermined curvature is inserted into the second curvature space portion 80 formed in the first and third housings 10 and 30, respectively.

As shown in FIG. 14, as the compressed elastic members 103 are stretched, the movement portion 102 of the second variable movement portion 100 moves toward the outer side of the third housing 30 and the end of the flexible display unit 60 moves back to the original position by the predetermined distance D2.

The flexible display unit 60, according to the embodiment of the present invention, is applicable to a portable communication device. However, the flexible display unit 60 may also be applied to various types of terminals including the flexible display unit 60, without being limited to a portable communication device.

Examples of the portable communication device according to the embodiments of the present invention may include not only mobile communication terminals operating according to communication protocols corresponding to various communication systems, but also any information communication apparatuses, electronic apparatuses, and multimedia apparatuses such as Portable Multimedia Players (PMPs), MP3 players, game players, notebooks, advertisement boards, TVs, digital broadcasting players, Personal Digital Assistants (PDAs), smart phones, and so forth, and their application apparatuses.

Those of ordinary skill in the art would recognize that the portable communication device including the flexible display unit according to the present invention described above is not limited by the foregoing embodiment and drawings, and various substitutions, modifications, and changes can be made.

What is claimed is:

1. A portable communication device having a flexible display unit, the portable communication device comprising:
   a first housing;
   each of second and third housings rotatably coupled to each end of the first housing;
   first and second hinge modules provided between the first, second, and third housings to enable the second and third housings to rotate with respect to the first housing; and
   the flexible display unit disposed on the first, second, and third housings and enabled to be curved or unfolded through rotation of the second and third housings, wherein the first, second, and third housings includes—
   first and second curvature received parts formed between the first, second, and third housings to receive a curved portion of the flexible display unit;
   a first movement portion coupled to one end of the flexible display unit to slide the flexible display unit on the second housing during the rotation of the second housing with respect to the first housing; and
   a second movement portion coupled to the other end of the flexible display unit to slide the flexible display unit on the third housing during the rotation of the third housing with respect to the first housing.

2. The portable communication device of claim 1, wherein the first hinge module comprises a first dual-axis hinge module, which provides first and second hinge axes, rotatably couples the second housing to an end of the first housing, and allows the flexible display unit to form the curvature or be unfolded through rotation of the second housing from the first housing.

3. The portable communication device of claim 2, wherein the first dual-axis hinge module comprises:
   a hinge housing, a side of which is open;
   a first gear shaft provided in the hinge housing and coupled to a pair of hinge arms provided on the first housing, the first gear shaft comprising a first gear portion;
   a second gear shaft provided in the hinge housing and coupled to a pair of hinge arms provided on the second housing, the second gear shaft comprising a second gear portion; and
   a plurality of gear cams engaged with the first and second gear portions.

4. The portable communication device of claim 3, wherein the first and second gear shafts comprise space grooves therein to provide the first curvature received part.

5. The portable communication device of claim 1, wherein the second hinge module comprises a second dual-axis hinge module, which provides third and fourth hinge axes, rotatably couples the third housing to an other end of the first housing, and allows the flexible display unit to form the curvature or be unfolded through rotation of the third housing from the second housing.

6. The portable communication device of claim 5, wherein the second dual-axis hinge module comprises:
   a hinge housing, a side of which is open;
   a first gear shaft provided in the hinge housing and coupled to the pair of hinge arms provided on the first housing, the first gear shaft comprising a first gear portion;
   a second gear shaft provided in the hinge housing and coupled to a pair of hinge arms provided on the third housing, the second gear shaft comprising a second gear portion; and
   a plurality of gear cams engaged with the first and second gear portions.

7. The portable communication device of claim 6, wherein the first and second gear shafts comprise space grooves therein to provide the second curvature received part.

8. The portable communication device of claim 1, wherein the first curvature received part is formed between the ends of the first housing and ends of the second housing and in the first hinge module.

9. The portable communication device of claim 1, wherein the second curvature received part is formed between the ends of the first housing and ends of the third housing and in the second hinge module.

10. The portable communication device of claim 1, wherein the first housing comprises a first frame comprising an inclined portion, which forms the first curvature received part.

11. The portable communication device of claim 1, wherein the first movement portion comprises:
- a second frame comprising an inclined portion provided on the second housing;
- a movement portion coupled to an end of the flexible display unit and movably coupled to the second frame, the movement portion moving from the second frame during rotation of the second housing to allow the flexible display unit to form the curvature or to be unfolded by being held and drawn; and
- at least one elastic member provided on the second frame to allow the movement portion to move by compressing or stretching the movement portion.

12. The portable communication device of claim 11, wherein the movement portion comprises:
- at least one movement support plate coupled to guide holes formed in the second frame to guide and support movement of the movement portion; and
- movement coupling portions coupled to elastic coupling portions formed in the second frame by passing the elastic coupling portions therethrough, the movement coupling portions moving along the elastic coupling portions.

13. The portable communication device of claim 12, wherein the second frame is provided with at least one elastic space comprising the elastic members, and
- elastic coupling portions coupled with the elastic members are formed in the elastic spaces.

14. The portable communication device of claim 11, wherein to unfold the flexible display unit by rotation of the second housing around the first and second hinge axes, the flexible display unit is drawn toward an inner side of the second housing and the movement portion moves together with the flexible display unit to compress the elastic members, and
- to form the curvature by folding the flexible display unit through rotation of the second housing around the first and second hinge axes, the compressed elastic members are stretched and the movement portion moves toward an outer side of the second housing to move the flexible display unit back to an original position.

15. The portable communication device of claim 1, wherein the second movement portion comprises:
- a third frame provided in the third housing;
- a movement portion coupled to an other end of the flexible display unit and movably coupled to the third frame, the movement portion moving from the third frame during rotation of the third housing to allow the flexible display unit to form the curvature or to be unfolded by being held and drawn; and
- at least one elastic member provided on the third frame to allow the movement portion to move by compressing or stretching the movement portion.

16. The portable communication device of claim 15, wherein the movement portion comprises:
- at least one movement support plate coupled to guide holes formed in the third frame to guide and support movement of the movement portion; and
- movement coupling portions coupled to elastic coupling portions formed in the third frame by passing the elastic coupling portions therethrough, the movement coupling portions moving along the elastic coupling portions.

17. The portable communication device of claim 16, wherein the third frame is provided with at least one elastic space comprising the elastic members, and
- elastic coupling portions coupled with the elastic members are formed in the elastic spaces.

18. The portable communication device of claim 15, wherein to unfold the flexible display unit by rotation of the third housing around the third and fourth hinge axes, the flexible display unit is drawn toward an inner side of the third housing and the movement portion moves together with the flexible display unit to compress the elastic members, and
- to form the curvature by folding the flexible display unit through rotation of the third housing around the third and fourth hinge axes, the compressed elastic members are stretched and the movement portion moves toward an outer side of the third housing to move the flexible display unit back to an original position.

19. The portable communication device of claim 1, wherein the first, second and third housings are provided with input and output devices which comprise at least one of a display unit, a touch screen, a keypad, a keyboard, a navigation key, and QWERTY keys.

20. A portable communication device comprising a flexible display unit, the portable communication device comprising:
- first, second, and third housings;
- first and second hinge modules provided between the first, second, and third housings to allow rotation of the second and third housings;
- the flexible display unit disposed on the first, second, and third housings and enabled to be curved or unfolded through rotation of the second and third housings;
- a first movement portion coupled to one end of the flexible display unit to slide the flexible display unit on the second housing during the rotation of the second housing with respect to the first housing, and
- a second movement portion coupled to the other end of the flexible display unit to slide the flexible display unit on the third housing during the rotation of the third housing with respect to the first housing.

* * * * *